United States Patent [19]
Volin et al.

[11] Patent Number: 6,032,363
[45] Date of Patent: *Mar. 7, 2000

[54] MANUFACTURE OF FITTING FROM METAL BILLETS OR STOCK HAVING CENTERLINE INHOMOGENEITIES

[75] Inventors: Timothy E. Volin, Decatur; James D. Gibson, Huntsville, both of Ala.

[73] Assignee: Parker-Hannifin Corporation, Cleveland, Ohio

[ * ] Notice: This patent issued on a continued prosecution application filed under 37 CFR 1.53(d), and is subject to the twenty year patent term provisions of 35 U.S.C. 154(a)(2).

[21] Appl. No.: 08/869,679

[22] Filed: Jun. 5, 1997

Related U.S. Application Data

[60] Provisional application No. 60/019,484, Jun. 10, 1996.

[51] Int. Cl.$^7$ ............................................. B23P 15/26
[52] U.S. Cl. ......................... 29/890.14; 29/557; 29/558; 29/415
[58] Field of Search ............... 29/526.2, 526.4, 29/557, 558, 412, 415, 890.14

[56] References Cited

U.S. PATENT DOCUMENTS

| | | | |
|---|---|---|---|
| 778,195 | 12/1904 | Hughes | 29/526.2 |
| 878,871 | 2/1908 | Dods | 29/526.2 |
| 942,489 | 12/1909 | Dods . | |
| 1,685,678 | 9/1928 | Mirfield | 29/890.14 |
| 1,860,605 | 5/1932 | Baldwin . | |
| 1,987,201 | 1/1935 | McAllister . | |
| 2,027,176 | 1/1936 | King | 29/890.14 |
| 2,074,712 | 3/1937 | Tross . | |
| 2,115,893 | 5/1938 | Urbaniak . | |
| 2,165,454 | 7/1939 | Cornell, Jr. . | |
| 3,740,813 | 6/1973 | Moore . | |
| 3,961,513 | 6/1976 | Stahly . | |
| 4,196,505 | 4/1980 | Usui . | |
| 4,288,907 | 9/1981 | Chumanov et al. . | |

FOREIGN PATENT DOCUMENTS

| | | | |
|---|---|---|---|
| 356001205 | 1/1981 | Japan | 29/526.2 |

*Primary Examiner*—Irene Cuda
*Attorney, Agent, or Firm*—John A. Molnar, Jr.

[57] ABSTRACT

Manufacture of a fluid connector fitting from an elongate metal stock, such as a plate or barstock, or a billet having an indefinite length and the potential for one or more centerline inhomogeneities which may extend along a longitudinal central axis thereof. In one embodiment, a metal stock is provided as having a cross-section of a first dimension which may be at least about equal to the extent of a first or second widthwise extent of the fitting and a second dimension which is at least about twice the extent of the other widthwise extent of the fitting. The stock is sectioned through the second dimension thereof along its longitudinal central axis to equally divide it into at least first and second workpieces. Each of the workpieces extends along a corresponding longitudinal axis thereof and has a cross-section of a first and a second width which may correspond, respectively, to the first and second widthwise extents of the fitting. In another embodiment, a billet is provided for forming an elongate barstock of a given cross-section and an indefinite length. The billet is sectioned through a central axis thereof into at least four workpieces of about equal cross-sections each having first and second sectioned surfaces which intersect to define an edge portion within which the potential inhomogeneities are localized. At least one workpieces is chamfered to remove the edge portion therefrom, and then is worked to form the barstock.

26 Claims, 8 Drawing Sheets

6,032,363

MANUFACTURE OF FITTING FROM METAL BILLETS OR STOCK HAVING CENTERLINE INHOMOGENEITIES

This application claims the benefit of U.S. Provisional application Ser. No. 60/019,484 filed Jun. 10, 1996.

BACKGROUND OF THE INVENTION

The present invention relates generally to pipe or tube fluid fittings such as miniature 2, 3 or more port branch connectors, and more particularly to the manufacture of the same from a metal billet or stock, such as a plate or barstock, having the potential for one or more centerline inhomogeneities.

Fittings of the type herein involved are well known as employed in a variety of applications to connect two or more runs of tubing, pipes, lines, or other conduits in fluid communication at a central junction. In basic construction, such fittings typically are formed from a metal such as copper, brass, steel, or stainless steel as a pressure vessel having two or more branches or bosses for mechanical or fusion coupling to the ends of the conduits to be joined. Depending upon the number and relative orientations of the branches, two port elbows and other configurations such as tees or crosses having three or more ports may be provided.

Recently, applications in the semiconductor and other electronics markets have dictated "miniaturized" fittings having port diameters of from about ⅛ to 1-inch and various wall thicknesses. Conventionally, these fittings are machined, for example, from a ⅝-inch by ⁵⁄₁₆-inch by ⅞-inch or similarly proportioned slug or blank sectioned from a length of a rectangular section metal barstock. In forming the barstock, molten metal such as steel is cast into a crucible or the like for solidification into a generally cylindrical ingot or billet. The solidified billet, in turn, is extruded, forged, rolled, drawn, or otherwise worked into an elongate barstock of a typically polygonal cross-section configured for the machining of the fitting therefrom with a minimum amount of wasted material.

It is known that contraction during the directional solidification of the billet results in the preferential concentration of inhomogeneities such as impurities, inclusions, occlusions, voids, or other defects within a "pipe" or core that extends along the longitudinal, i.e., axial, centerline thereof. As the billet is worked to reduce its cross-section, the inhomogeneities are propagated as "stringers" along the central longitudinal axis of the resulting barstock and, in turn, along the centerline of each of the blanks sectioned therefrom. If one of these centerline inhomogeneities intersects a wall or other pressure boundary of the fitting, the likelihood that the fitting will fail prematurely in service is increased. A defect rate even as low as about 0.1%, however, is considered unacceptable for ultra high purity gas or other critical applications.

Proposals have been made for methods of manufacturing fittings and for reducing centerline defects in billets. For example, U.S. Pat. No. 942,489 discloses a method of removing the "pipe" from an ingot for producing wrought articles that are free from flaws. The method entails passing a heated ingot through a set of rollers in a rolling mill that are provided with flanges. The roller flanges effect the separation of the contaminated central portion of the ingot from between a pair of relatively defect-free, surrounding outer portions.

U.S. Pat. No. 1,987,201 discloses a method of making seamless tubing via the centrifugal casting of an ingot in a cylindrical, rotating mold. The centrifugal force that is developed during the solidification of the ingot concentrates any impurities, voids, or other defects along the longitudinal axis of the ingot. A hole then is bored longitudinally through the axial center of the ingot prior to the rolling thereof for removing the contaminated area within which the defects have been concentrated.

U.S. Pat. No. 2,074,712 discloses a method of making welding rods from a steel ingot having a contaminated central "pipe" portion and a purer rim portion. The ingot is rolled for its reduction into a flattened strip or plate so as to expand the rim section at the edges of the resulting strip. The edge then may be removed by a slitting operation as strands that are cut from the strip.

U.S. Pat. No. 2,115,893 discloses a method of coring and dividing steel ingots for removing the defective core portion thereof. The ingot is cast in a conventional manner in a cruciform cross-section, and then is placed between a die structure having a similar but slightly larger cruciform cross-section. A punch having a cross-section substantially equal to the cross-section bounded by the arms of the die structure is driven lengthwise through the ingot removing the defective core portion and filling the arms of the die structure with the remaining metal of the ingot. The reference notes that it had been known to remove the defective core portion of a steel or other metal ingot by dividing the ingot along the core and removing the defective portions thereof by means of a suitable cutting tool.

U.S. Pat. No. 4,288,907 discloses a method of making billets whereby a composite billet is produced by continuous casting or rolling. The billet is formed as having a star-shaped cross-section with a central portion and ray members disposed symmetrically to the central longitudinal axis of the billet. The "pipe" or segregation zone of the billet is caused to be concentrated within the central portion such that the ray members may be severed therefrom. The reference further describes another method of making billets involving separating the billet in the direction of its length into two or three sections that allows the area of axial segregation to be removed by planing.

U.S. Pat. No. 4,196,505 discloses a method of making fuel injection pipes from a steel bar material. A pipe body is formed by cutting and removing an interposed slag layer that is collected and deposited along the longitudinal axis of the bar. The pipe body so formed then is elongated to the desired dimensions.

As to the general manufacture of branch connectors and similar fittings, U.S. Pat. No. 1,860,605 discloses a method of forming tube fittings for hydraulic brake systems. The fittings are machined from severed sections of a solid metal bar or rod.

U.S. Pat. No. 2,165,454 discloses a method of fabricating T-fittings from a preformed metal rod that eliminates certain drilling and machining operations. A section of the rod is severed to having a cubic content corresponding to that of the fitting. The section then is cold-worked within a punch and die assembly into the desired fitting configuration.

U.S. Pat. No. 3,740,813 discloses a method of making a pressure pipe connector tee of a relatively large size and wall thickness. A solid metal workpiece is heated to forging temperature, peripherally confined within a die, and then hollow punched to provide a selected wall portion that is sufficiently thick to permit the formation of branch pipe passages therein.

U.S. Pat. No. 3,961,513 discloses a method of making a tee-shaped pipe fitting. A solid plug of malleable metal is deformed to provide a closed-end tube having a thicker wall portion adjacent the closed end. The tube then is further deformed to provide a pair of legs adjacent the closed end.

The above-referenced methodologies heretofore have constituted the state of the art with respect to the manufacture of branch connectors and other fittings of the type herein involved. It will be appreciated, however, that continued improvements in such methodologies would be well-received by industry in general, and especially those industries such as the semiconductor industries having applications which dictate miniaturized fittings of high integrity. Preferred methods would allow for the economical manufacture of such fittings, while assuring a negligible rejection rate.

SUMMARY OF THE INVENTION

The present invention is directed to the manufacture of metal fittings from a billet or stock, such as a plate or barstock, having potential centerline defects, and particularly to the manufacture of miniature branch fluid connectors such as elbows and tees having relatively short port lengths and thin wall thicknesses. In providing for the segregation of potential defects from the critical areas of the fitting, the present invention reduces the possibility that a pressure boundary of the fitting will be penetrated by a defect. Thus, the rejection rate in the manufacture of such fittings is reduced, as is the potential for service failures.

It is therefore a feature of a preferred embodiment of the present invention to provide a method of forming a fluid connector fitting from an elongate metal stock having an indefinite length and the potential for one or more centerline inhomogeneities which may extend along a longitudinal central axis or plane thereof. The barstock is provided as having a cross-section of a first dimension which for a barstock is preferably is at least about equal to the extent of a first or second widthwise extent of the fitting, and a second dimension which is at least about twice the extent of the other widthwise extent of the fitting. The stock is sectioned through the second dimension thereof along its longitudinal central axis or plane to divide it generally equally into at least first and a second workpiece. Each of the workpieces may extend along a corresponding longitudinal axis thereof and have a cross-section of a first and a second width which correspond, respectively, to the first and second widthwise extents of the fitting. At least one of the workpieces may be sectioned generally perpendicular to the longitudinal axis thereof into at least one blank having a length at least about equal to the lengthwise extent of the fitting. The fitting then is machined from the stock or blank.

It is a further feature of a preferred embodiment of the present invention to provide a method of forming a workpiece or blank for the machining of a fluid connector fitting from an elongate metal stock having an indefinite length and one or more potential centerline defects which may extend along a longitudinal central axis thereof. The stock is provided as having a cross-section of a first dimension which for a barstock is at least about equal to the extent of a first or second widthwise extent of the fitting and a second dimension which is at least about twice the extent of the other widthwise extent of the fitting. The stock is sectioned through the second dimension thereof along the longitudinal central axis or plane for its equal division into at least a first and a second workpiece. Each of the workpieces may extend along a corresponding longitudinal axis thereof and has a cross-section of a first and a second width which correspond, respectively, to the first and second widthwise extents of the fitting. At least one of the workpieces may be sectioned generally perpendicular to the longitudinal axis thereof into at least one blank having a length at least about equal to the lengthwise extent of the fitting.

It is yet a further feature of a preferred embodiment of the present invention to provide a method of forming an elongate stock of a given cross-section and an indefinite length from a metal billet having a longitudinal central axis and one or more potential centerline defects which may be disposed within a core region that extends along the central axis. The billet is sectioned through the central axis thereof into at least four workpieces of about equal cross-sections, each of the workpieces having first and second sectioned surfaces which intersect to define an inner edge portion within which at least a portion of the core region of the billet is localized. At least one, and preferably each, of the workpieces is chamfered to remove the edge portion therefrom, and then worked to form the stock.

Advantages of the present invention include the fabrication of metal fittings such as miniature 2, 3 or more port branch connectors having reduced rejection rates in manufacture as well as reduced potential for service failures. Additional advantages include the economical realization of such manufacture without an excessive waste of material, extraneous processing steps, or complicated assurance testing. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

These drawings are described further in connection with the following Detailed Description of the Invention.

DETAILED DESCRIPTION OF THE INVENTION

Figure 1:
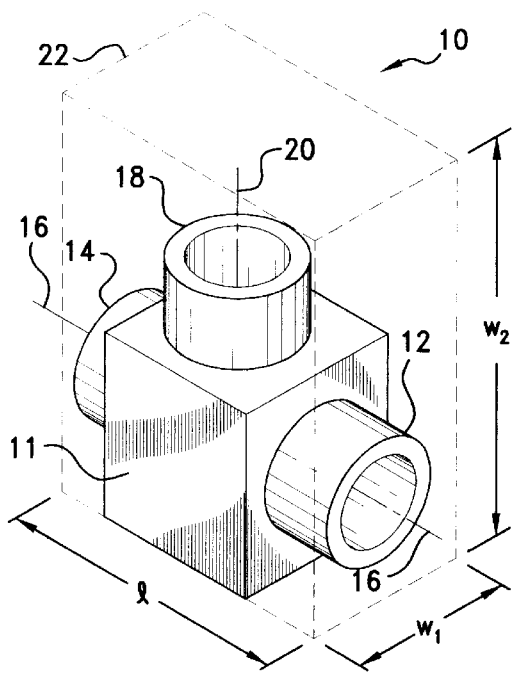
FIG. 1 is a perspective view of a representative tee-shaped, branched fluid connector fitting of the "miniature" variety herein involved.

For the purposes of the discourse to follow, the precepts of the invention herein involved are described in connection with the fabrication of "miniature" 2- or 3-port branch fluid connector fittings, i.e., "tees" or "elbows." Such fittings typically have port diameters of about 1/8 to 1-inch and, with respect to the 3-port "tee" variety, are machined from, for 1/2-inch port diameters, a 7/8-inch by 5/8-inch by 1-inch blank or, for 1/4-inch port diameters, a 5/8-inch by 5/16-inch by 7/8-inch blank of a weldable stainless steel material such as type 316L. It will be appreciated, however, that aspects of the present invention may find utility in the manufacture of fluid connectors and fittings of other configurations which may be constructed of other metal materials such as copper, brass, steel, titanium, nickel or an alloy thereof. Use in the manufacture of fittings other than those illustrated therefore should be considered to be expressly within the scope of the present invention. Additionally, the conventions which may be used herein to represent direction or coordinate space are interchangeable and are specified for convenience only rather than for any limiting purpose Referring then to the figures wherein corresponding reference characters are used to designate corresponding elements throughout the several views, shown generally at 10 in FIG. 1 is a representative 3-port branch fluid connector fitting or "tee" of the variety herein involved. As is shown, fitting 10 is formed generally as a pressure vessel having a body portion, 11, with tubular first and second branches, 12 and 14, extending from opposite ends thereof along a first axis, 16, and a tubular third branch, 18, extending along a second axis, 20, which is disposed perpendicularly to first axis 16. Each of the ends of branches 12, 14, and 18 are configured for coupling in fluid communication with one or more fluid conduits via welded, threaded, or compression connections or the like.

Fitting 10 may be of a conventional stainless steel construction, and is volumetrically defined by the polyhedron represented in phantom at 22. Polyhedron 22 has a first widthwise extent, $w_1$, a second widthwise extent, $w_2$, and a lengthwise extent, l, each of which corresponds to a given outer extent or margin of fitting 10.

Figure 2:
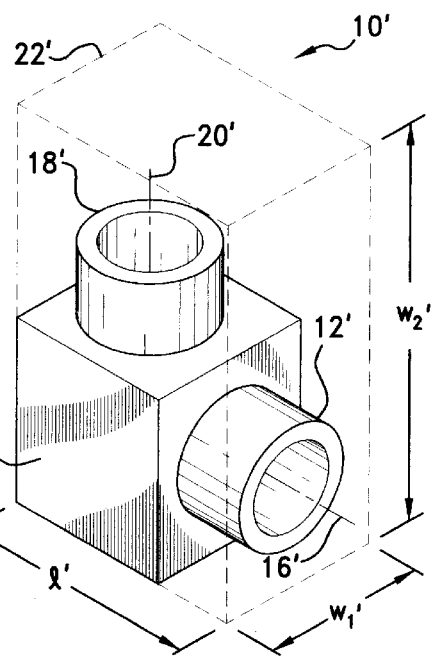
FIG. 2 is a perspective view of a representative elbow-shaped, branched fluid connector fitting of the "miniature" variety herein involved.

Looking next to FIG. 2, an alternative 2-way or 90° "elbow" embodiment of fitting 10 is shown generally at 10'. Fitting 10' is similarly formed as a pressure vessel having a body portion, 11', with tubular first and second branches, 12' and 18', extending orthogonally therefrom along corresponding first and second axes, 16' and 20'. Again, fitting 10' is volumetrically defined by polyhedron 22' having a first widthwise extent, $w_1'$, a second widthwise extent, $w_2'$, and a lengthwise extent, l', each of which corresponds to a given outer extent or margin of fitting 10'.

Figure 3:
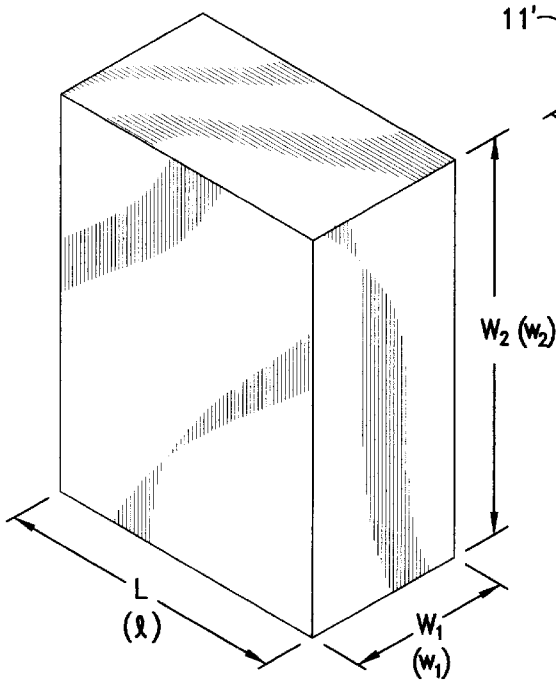
FIG. 3 is a perspective view of a metal slug or blank configured for the machining of the fitting of FIG. 1 therefrom.

Turning to FIG. 3, a metal blank or slug which is configured for the machining of a fitting, such as fitting 10 or 10' of FIGS. 1 or 2, is shown generally at 30. As mentioned, blank 30 typically will be provided as formed of a weldable, stainless steel material such as type 316L or an equivalent, and is dimensioned in conformance with the lengthwise and widthwise extents of fitting 10 or 10'. In this regard, blank 30 is defined as having a length, L, which is at least about equal in extent to the fitting lengthwise extent l or l', and a cross-section of first and second widths, $W_1$ or $W_1'$ and $W_2$ or $W_2'$, which correspond in extent to fitting widthwise extents $w_1$ or $w_1'$ and $w_2$ or $w_2'$. Accordingly, blank 30 may be subjected to one or more conventional machining operations such as milling, drilling, lathing, and the like for the fabrication of fitting 10 therefrom.

Figure 4:
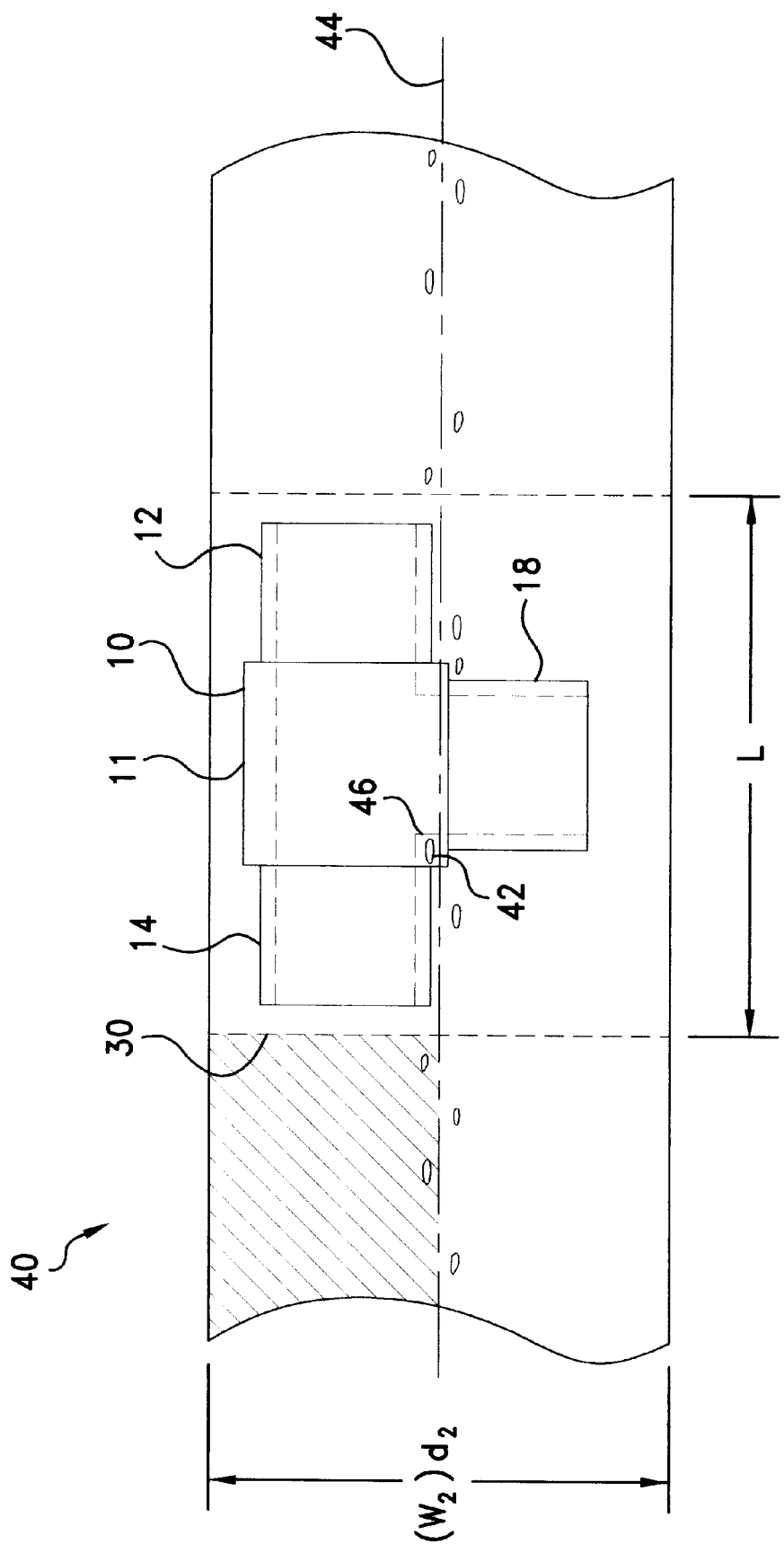
FIG. 4 is a schematic, longitudinal sectional view of a length of metal barstock dimensioned according to the prior art showing the layout of the fitting of FIG. 1 therein.

As is illustrated in FIG. 4, blank 30 heretofore itself was sectioned from an indefinite length of barstock, shown generally at 40, of a first dimension, $d_1$ (not shown), corresponding to, for example, blank 30 width $W_1$ in being at least about equal to fitting 10 widthwise extent $w_1$, and a second dimension, $d_2$, corresponding to blank 30 width $W_2$ in being at least about equal to fitting 10 widthwise extent $w_2$. However, and as was aforementioned, it is known that contraction and other effects occurring during the solidification of the billet from which barstock 40 was formed may result in the concentration of inhomogeneities such as impurities, inclusions, occlusions, voids, or other defects within a "pipe" or core that extends along the axial centerline of the billet. As the billet is rolled or otherwise worked to reduce its cross-section, the potential inhomogeneities, one of which is referenced at 42, are propagated along the longitudinal axis, 44, of the resulting barstock and, in turn, along the centerline of each of the blanks such as blank 30 sectioned therefrom.

Although these potential inhomogeneities may be as small as 0.1 to 1 thousandth of an inch in diameter, the elongation of the billet during its working effects a corresponding elongation of the defects in the direction of the grain of the metal to an extent that the length of the defects may approach or exceed the wall thickness of the fitting. If, as with defect 42, one of these centerline defects intersects a wall or other pressure boundary of the fitting, such as wall 46 of fitting 10, then the potential that the fitting could fail prematurely in service is increased.

Figure 5:
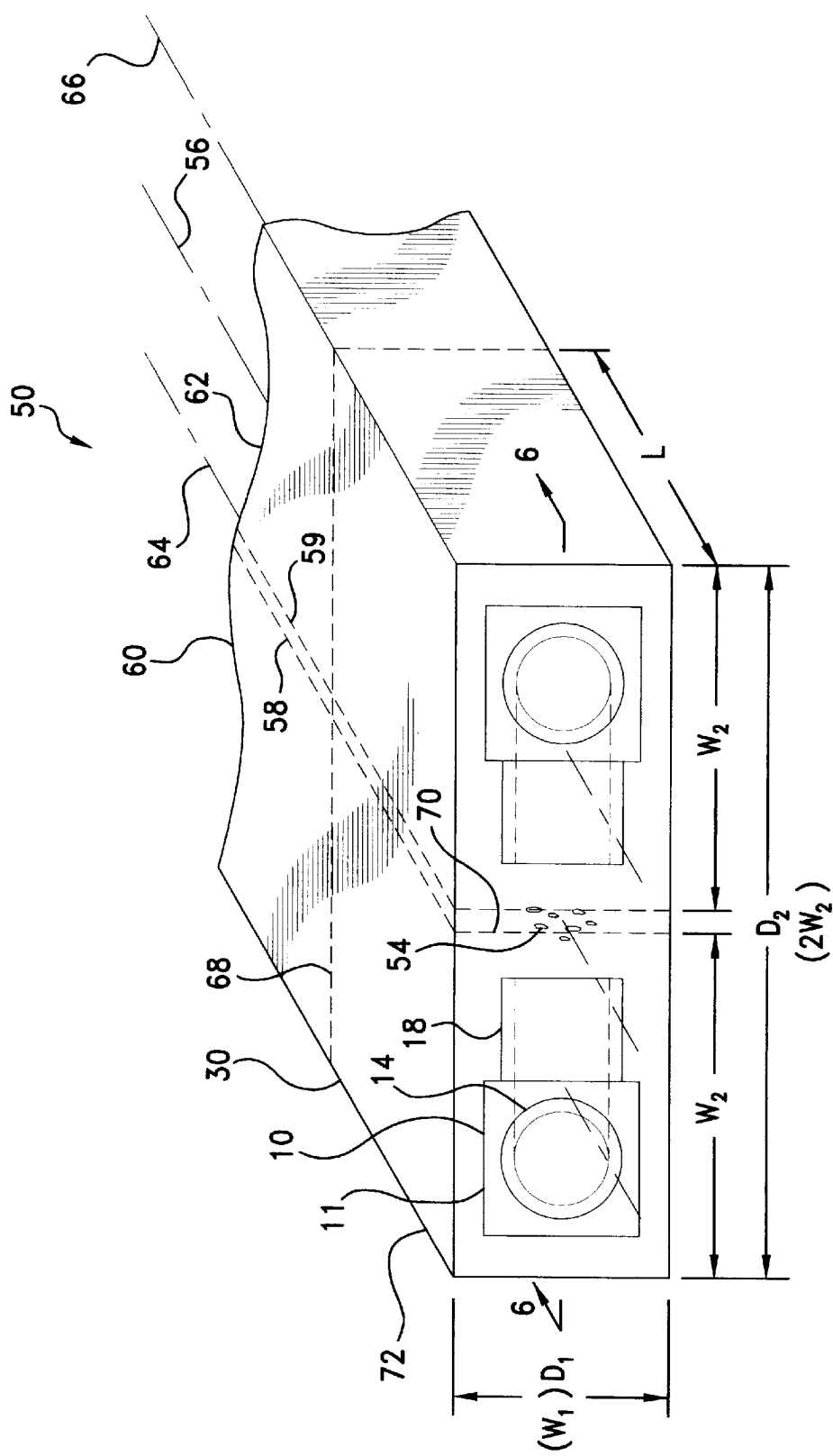
FIG. 5 is a schematic, perspective end view of a length of metal barstock dimensioned according to the present invention showing the layout of the fitting of FIG. 1 therein.
Figure 6:
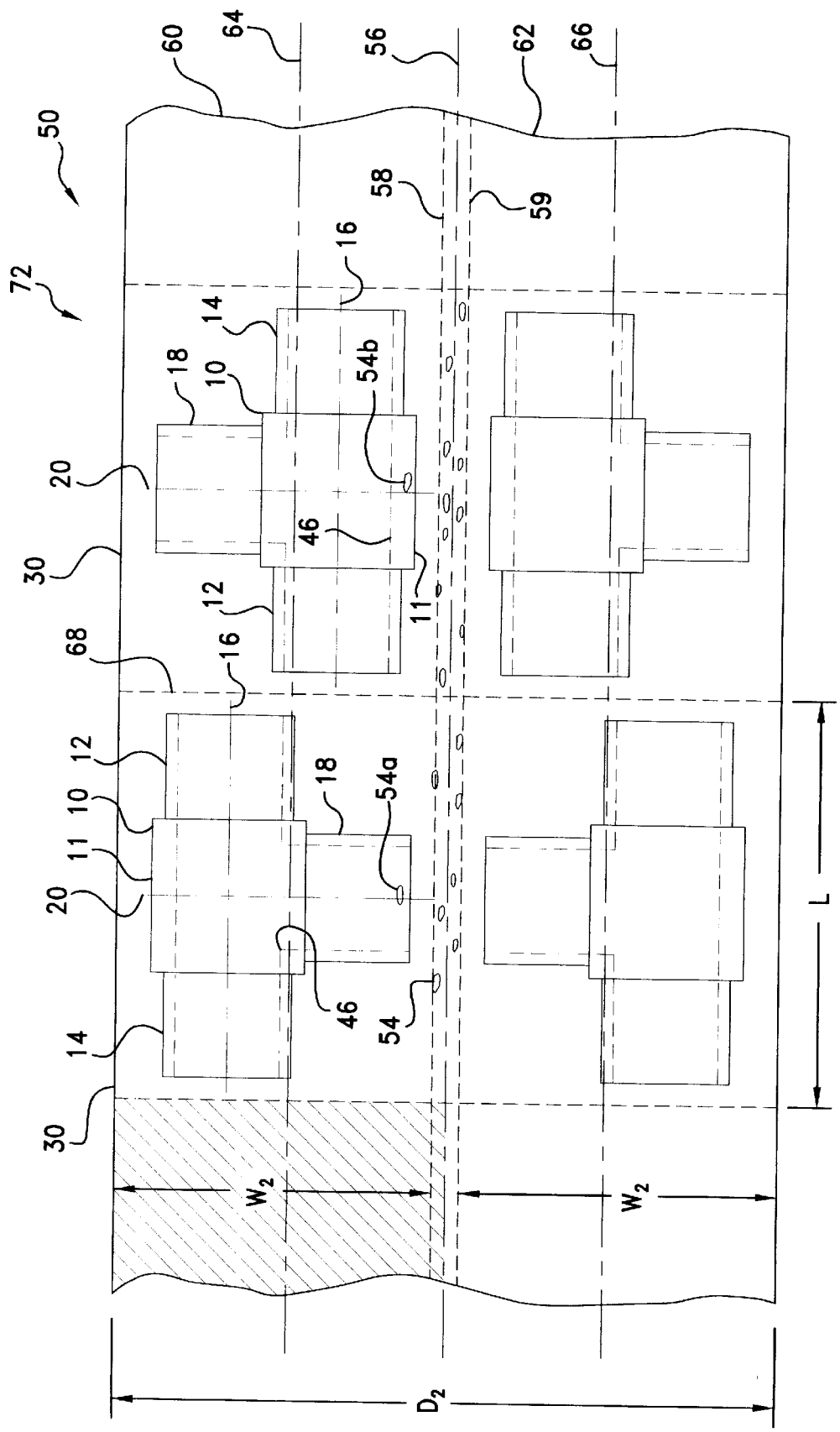
FIG. 6 is a longitudinal cross-sectional view of the barstock of FIG. 5 taken through plane 6—6 of FIG. 5.

Referring next to FIGS. 5 and 6 wherein the method of the present invention is illustrated in schematic, such method includes the provision of a metal barstock, shown generally at 50, which, as before, is of an indefinite length with one or more centerline defects, 54, extending along a longitudinal central axis, 56, thereof. In contrast to the previously practiced methods which heretofore had constituted the state of the art, however, the method of the present invention comprehends providing barstock 50 as having a cross-section, for example, of a first dimension, $D_1$ (FIG. 6), which is at least about equal to the extent of the first or second widthwise extent $w_1$ or $w_2$ of fitting 10 (FIG. 1), and a second dimension, $D_2$, which is at least about twice the extent of the other widthwise extent of fitting 10.

By "at least about equal," it is meant that the specified dimensions include some tolerance or range, from about 0.01–0.1 inch for example, to accommodate for subsequent cutting and other machining operations to be performed on the barstock and on the blanks which are sectioned therefrom. For the purposes of the present illustration, barstock 50 dimension $D_1$ is shown as corresponding to blank 30 width $W_1$ in being at least about equal to fitting 10 widthwise extent $w_1$, with dimension $D_2$ being at least about twice blank 30 width $W_2$ and fitting 10 widthwise extent $w_2$. In this regard, and as may be seen with reference to FIG. 5, barstock 50 has a generally rectangular cross-sectional profile with dimension $D_2$ being about three to four times the magnitude of dimension $D_1$.

In accordance with the precepts of the present invention, barstock 50 is cut or otherwise sectioned, as is represented by lines 58 and 59, through second dimension $D_2$ to equally divide it into first and second workpieces, 60 and 62, extending along corresponding longitudinal axes, 64 and 66.

The sectioning of barstock 50 may be effected, for example, using a conventional bandsaw or by other techniques including abrasive water jet cutting, laser cutting, or electro-discharge machining (EDM). Each of workpieces 60 and 62 have a cross-section (FIG. 5) of a first and second width corresponding, respectively, to widths $W_1$ and $W_2$ of blank 30 (FIG. 2) and, in turn, being at least about equal to widthwise extents $w_1$ and $w_2$ (FIG. 1) of fitting 10. Thus, for yielding one or more of blanks 30, workpieces 60 and 62 may be sectioned, as is represented by line 68, to a length which corresponds to length L of blank 30 in being at least about equal to the lengthwise extent l of fitting 10.

As may be seen in FIG. 5, each blank 30 so formed has a first surface, 70, through which barstock 50 was sectioned, and an opposing second surface, 72. It will be appreciated that depending upon the width of the saw or other cut defined by lines 58 and 59, at least a portion of the potential centerline defects 54 occurring in barstock 50 will be removed. Moreover, and as is shown in FIGS. 5 and 6, as a result of the instant dimensioning of barstock 50, fitting 10 may be machined from blank 30 thereof such that fitting first axis 16 is disposed generally parallel to blank first surface 70, with fitting second axis 20 being disposed generally perpendicular to blank first surface 70 as extending from fitting 10 toward blank first surface 70. Accordingly, the majority of any remaining centerline defects, such as the defect referenced at 54a, are localized in a relatively non-critical area adjacent the terminal end of fitting branch 18. In this regard, the normal machining of this end removes additional material and more of the defects. Also, when branch 18 is coupled to a fluid conduit or the like via a welded connection, such area is subject to the normalizing thermal effects of melting and resolidification which disperse the defects more uniformly within the weld zone. The convergence of all these effects significantly reduces the potential for the penetration of the pressure boundary of the installed fitting by a centerline defect. Alternatively, fitting 10 may be machined directly from workpieces 60 and 62.

As is referenced in FIG. 6 generally at 72, in another embodiment of the present invention, fitting 10 may be machined from blank 30 such that fitting second axis 20 is oriented as extending from the fitting toward blank second surface 72 (FIG. 5). In such orientation, and as is shown for the defect referenced at 54b, the majority of the centerline defects 54 are thereby aligned to run generally parallel to and outside of the pressure boundary 46 of fitting 10. This alignment minimizes the likelihood that a wall or other pressure boundary of the fitting will be breached by a defect.

Figure 7:
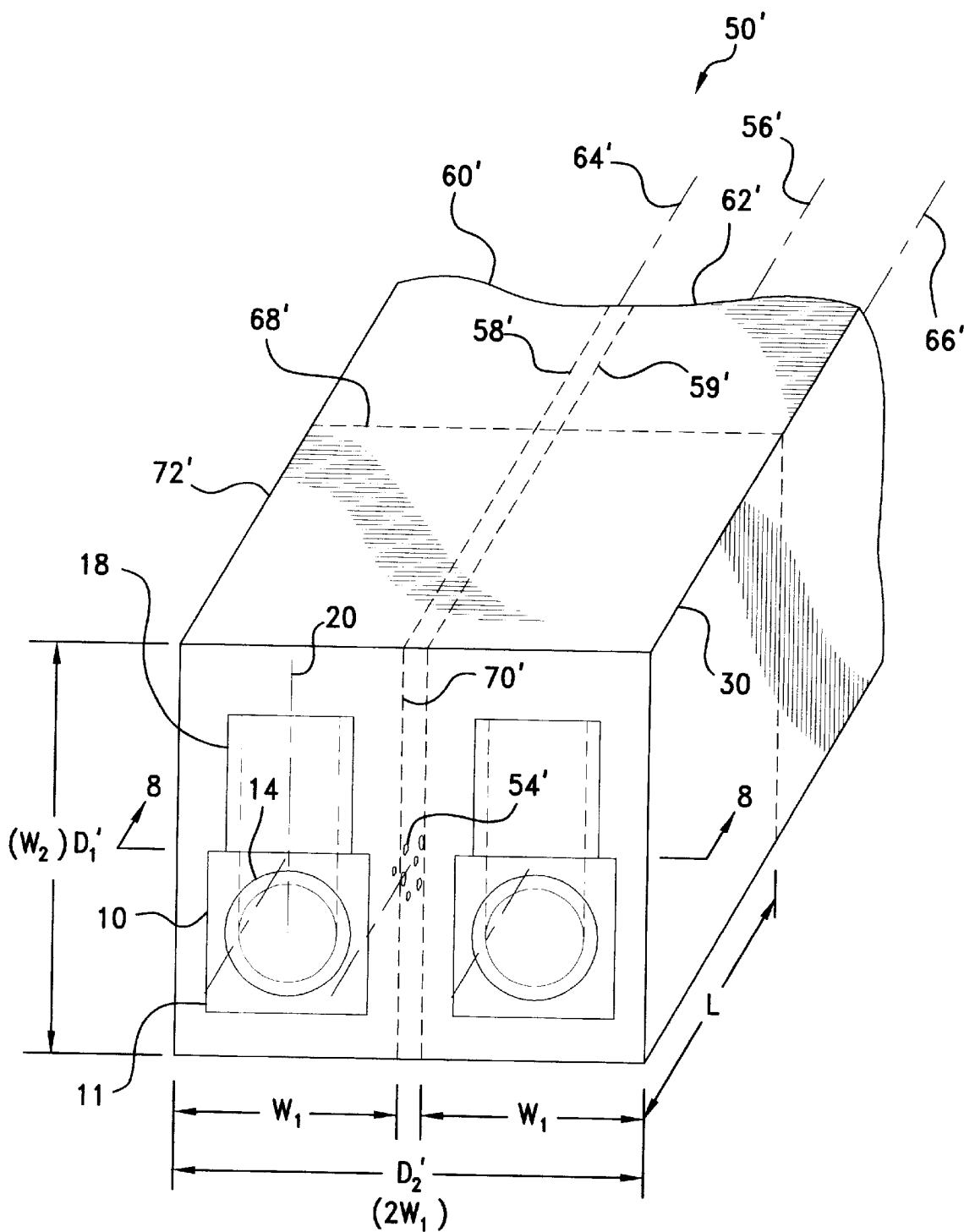
FIG. 7 is a schematic, perspective end view of a length of metal barstock dimensioned according to the present invention showing an alternative layout of the fitting of FIG. 1 therein.
Figure 8:
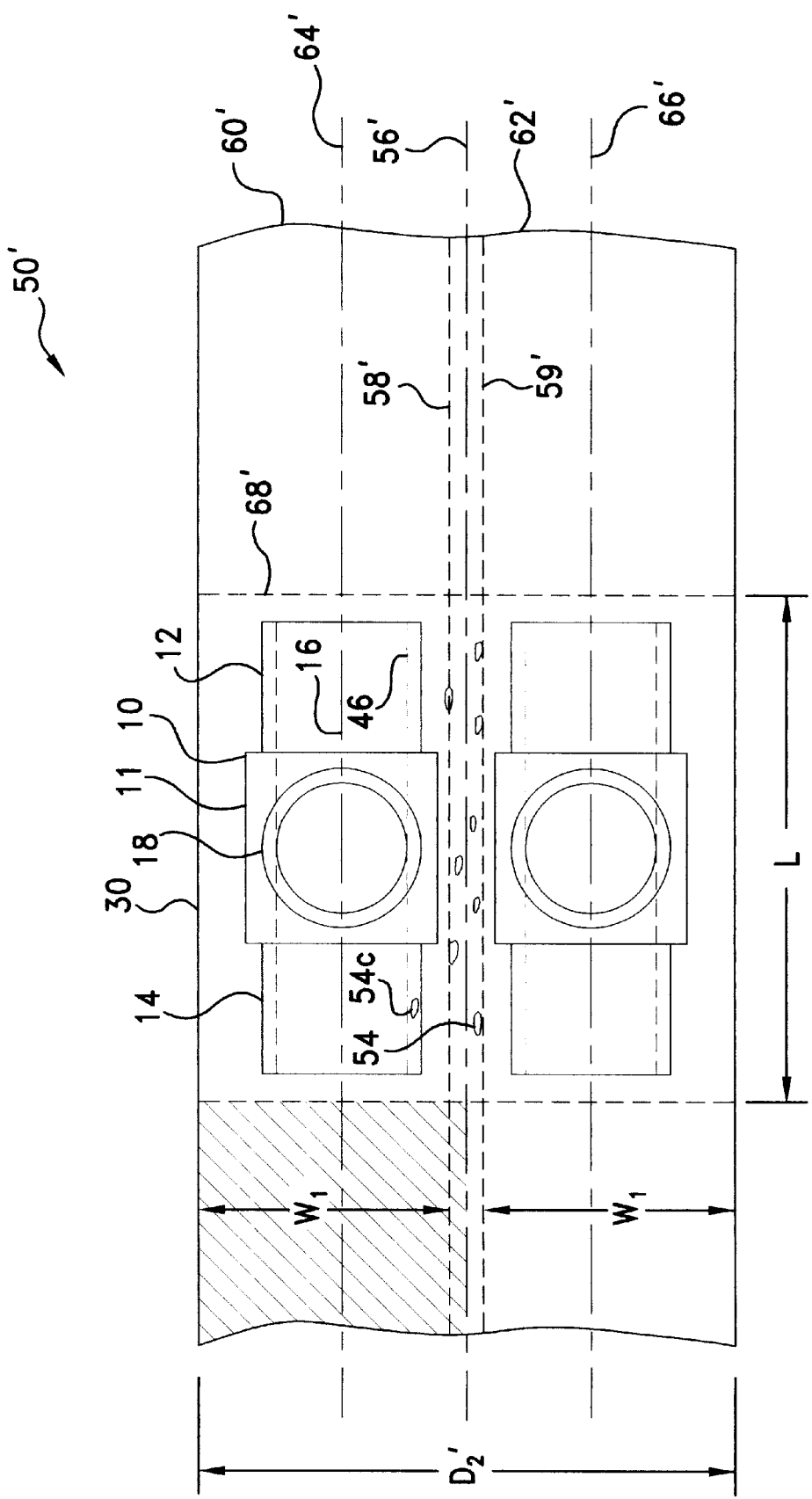
FIG. 8 is a longitudinal cross-sectional view of the barstock of FIG. 7 taken through plane 8—8 of FIG. 7.

Looking next to FIGS. 7 and 8, an alternative configuration of barstock 50 is referenced generally at 50'. In further accordance with the precepts of the present invention barstock 50' is provided as having a first dimension, $D_1'$, which corresponds to blank 30 width $W_2$ in being at least about equal to fitting 10 widthwise extent $w_2$, and a second dimension, $D_2'$ which is at least about twice blank 30 width $W_1$ and fitting 10 widthwise extent $w_1$. That is, and as may be seen with reference to FIG. 7, barstock 50' is provided as having a generally square cross-sectional profile with dimension $D_1'$ being about equal to dimension $D_2'$.

As before, barstock 50' is cut or otherwise sectioned, as is represented by lines 58' and 59', through second dimension $D_2'$ to equally divide it into first and second workpieces, 60' and 62', extending along corresponding longitudinal axes, 64' and 66'. Each of workpieces 60' and 62' have a cross-section (FIG. 7) of a first and second width corresponding, respectively, to widths $W_2$ and $W_1$ of blank 30 (FIG. 2) and, in turn, being at least about equal to widthwise extents $w_1$ and $w_2$ (FIG. 1) of fitting 10. Thus, for yielding one or more of blanks 30, workpieces 60' and 62' may be sectioned, as is represented by line 68', to a length which corresponds to length L of blank 30 in being at least about equal to the lengthwise extent l of fitting 10.

As may be seen in FIG. 7, each blank 30 so formed again has a first surface, 70', through which barstock 50' was sectioned, and an opposing second surface, 72'. It will be appreciated that, as with respect to barstock 50 (FIGS. 5 and 6), depending upon the width of the saw or other cut defined by lines 58' and 59', at least a portion of the centerline defects 54 occurring in barstock 50' may be removed, with additional defects being removed during the normal machining of surface 70'. In this regard, the generally square profile of barstock 50' advantageously results in defects which are more circular than elliptical in cross-section, and which therefore are more completely removed by the saw cut. Moreover, and as is shown in FIGS. 7 and 8, as a result of the instant dimensioning of barstock 50, fitting 10 may be machined from blank 30 thereof such that fitting first and second axes 16 and 20 (FIG. 7) are disposed generally parallel to blank first surface 70'. The majority of any remaining centerline defects, such as the defect referenced at 54c, are thereby aligned to run generally parallel to and outside of the pressure boundary 46 of fitting 10 which further minimizes the potential that a wall or other pressure boundary of the fitting will be breached by a defect. Alternatively, fitting 10 again may be machined directly from workpieces 60' and 62'.

It will be appreciated that the above-described layouts of tee fitting 10 in barstocks 50 and 50' may be extrapolated to other fitting configurations such as elbow 10' of FIG. 2. For example, the barstock and may be dimensioned for the machining of fitting 10' from a blank thereof such that fitting first and second axes 16' and 20' are disposed generally parallel to the sectioned surface of the blank first surface 70'. In such a layout, the orientation of the centerline defects is aligned generally parallel to fitting pressure boundary 46' of the fitting 10' for further minimizing the potential that a wall or other pressure boundary of the fitting will be breached by a defect. Alternatively, the barstock may be dimensioned for the machining of fitting 10' such that fitting first or second axis 16' or 20' is disposed generally parallel to blank first surface 70', with the other fitting axis 16' or 20' being disposed generally perpendicular to blank first surface 70' as extending from fitting 10' toward blank first surface 70' or second surface 72'. In this particular layout, the majority of any remaining centerline efects are localized near the surface and are aligned generally parallel to fitting pressure boundary 46' of the fitting.

With reference again to FIG. 7, the present invention further comprehends the provision of barstock 50' wherein first dimension $D_1'$ also is at least about twice blank 30 width $W_1$ and fitting 10 widthwise extent $w_1$. In such configuration, barstock 50' additionally is cut or otherwise sectioned through first dimension $D_1'$, as is similarly shown in FIG. 5, to equally divide it into at least four workpieces extending along corresponding longitudinal axes. Advantageously, the majority of any remaining centerline defects are concentrated in one corner only of the workpieces so formed. Such localization further minimizes the potential that a wall or other pressure boundary of the fitting will be breached by a defect.

Figure 9:
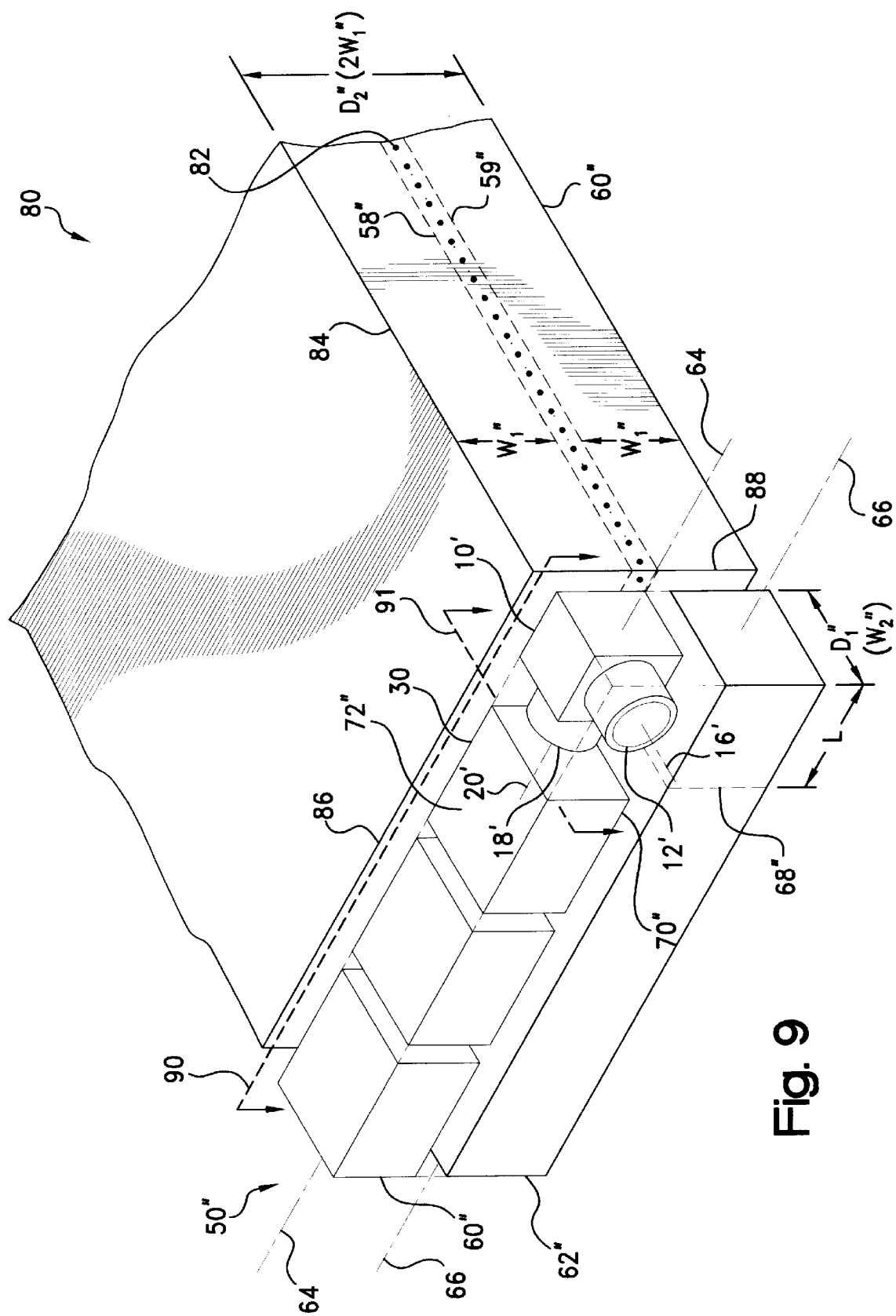
FIG. 9 is a perspective view of a length of metal platestock dimensioned according to the present invention and showing the layout of the fitting of FIG. 2 therein.

Turning next to FIG. 9, another alternative configuration of barstock 50 is shown generally at 50" as having been sectioned from a length of metal plate stock, 80. In this regard, it is known that some of the less common, more exotic metal alloys, such as Hastelloy® nickel/chromium/molybdenum alloy, typically are more readily available commercially in "platestock" rather than in rectangular barstock form. Similarly as with barstock configurations, contractual and other effects occurring during the solidification of the billet again may result in the concentration of inhomogeneities, but now as deposited within a planar centerline, such as the plane which is referenced in phantom in FIG. 9 at 82. As is detailed hereinafter, however, the methodology of the present invention is equally applicable to platestock configurations. Accordingly, for the purposes of the present disclosure, the term "centerline" should be understood to refer interchangeably to the concentration of defects or other inhomogeneities along a longitudinal central axis, which may be linear or planar, of the barstock or plate.

In this regard, in further accordance with the precepts of the present invention, platestock 80, which may be of an indefinite lengthwise dimension, referenced at 84, and a widthwise dimension, referenced at 86, which also may be indefinite, is provided as having a thickness dimension, 88, which is, for example, at least about twice blank 30 width $W_1$ and fitting 10' widthwise extent $w_1$'. By sectioning through the lengthwise dimension 84 of platestock 80 along, for example, the plane referenced at 90, barstock 50" thereby may be formed as having a first dimension, $D_1$", which corresponds to blank 30 width $W_2$ in being at least about equal to fitting 10' widthwise extent $w_2$', and a second dimension, $D_2$', which is at least about twice blank 30 width $W_1$ and fitting 10' widthwise extent $w_1$'.

So formed, barstock 50" may be cut or otherwise sectioned, as is represented by the lines 58" and 59" which are shown on the remainder of the platestock 80, through second dimension $D_2$" to equally divide it into first and second workpieces, 60" and 62", extending along corresponding longitudinal axes, 64" and 66". Alternatively, it will be appreciated that the workpieces may be formed by first sectioning plate 80 through lines 58" and 59", and then sectioning each of the resulting halves through plane 90. In either case, each of workpieces 60" and 62" have a cross-section of a first and second width corresponding, respectively, to widths $W_2$ and $W_1$ of blank 30 (FIG. 2). Thus, for yielding one or more of blanks 30, workpieces 60" and 62" may be sectioned along, for example, a succession of parallel planes, one of which is referenced at 91 for workpiece 60", to a length which corresponds to length L of blank 30 in being at least about equal to the lengthwise extent l' of fitting 10'.

Each blank 30 so formed again has a first surface, 70", through which barstock 50" was sectioned, and an opposing second surface, 72". It will be appreciated that, as with respect to barstocks 50 and 50', depending upon the width of the saw or other cut defined by lines 58" and 59", at least a portion of the centerplane defects 80 occurring in barstock 50" may be removed, with additional defects being removed during the normal machining of surface 70" in forming, for example, fitting 10' of FIG. 2. Once again, it will be appreciated that the above-described layout of elbow fitting 10' in workpiece 60" may be extrapolated to other fitting configurations such as tee 10 of FIG. 1.

Figure 10:
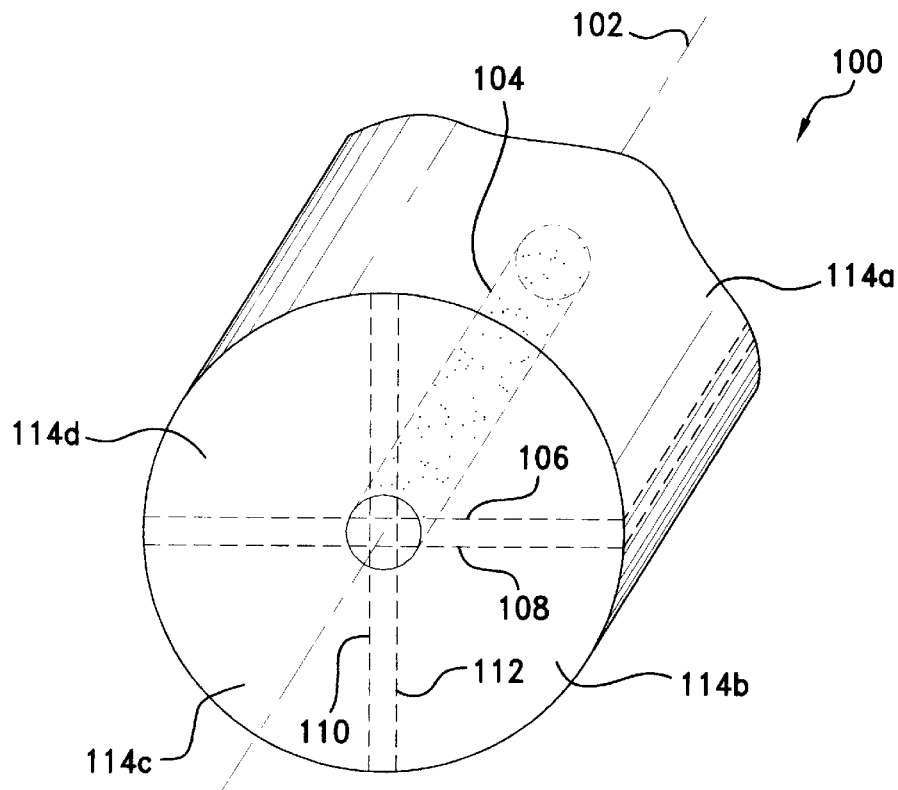
FIG. 10 is a schematic perspective view of a metal billet as lined, according to the present invention, for quartering into four workpieces of about equal cross-section.
Figure 11:
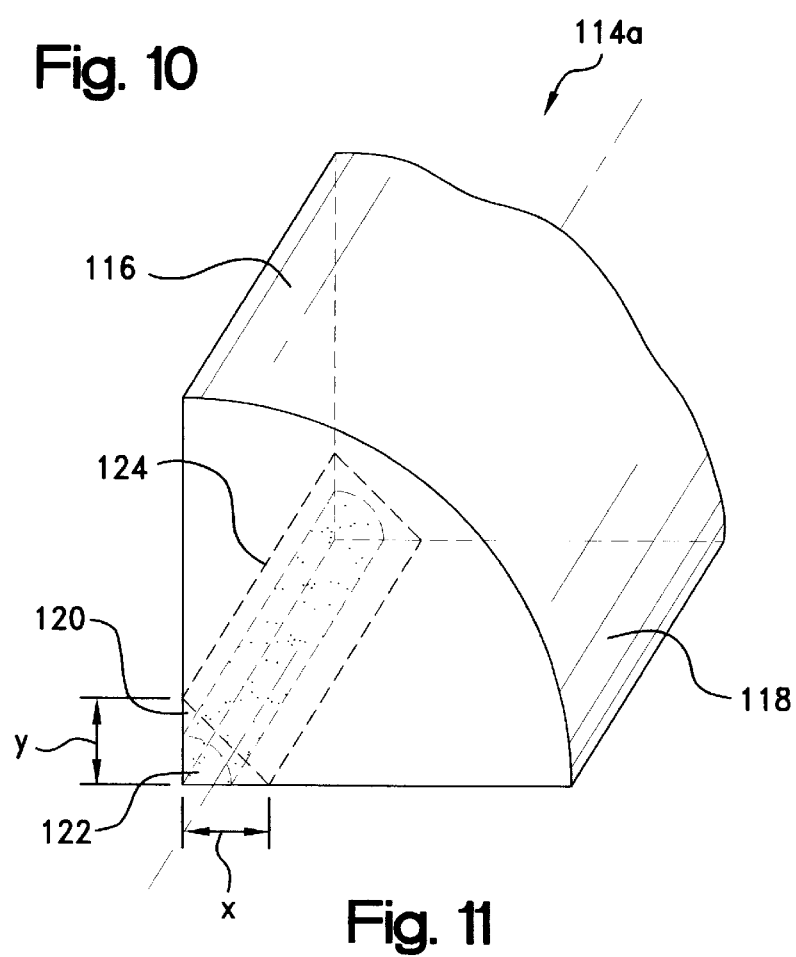
FIG. 11 is a schematic perspective view of one of the workpieces of FIG. 9 as lined, according to the present invention, for chamfering according to the present invention.

Referring lastly to FIGS. 10 and 11, in yet another embodiment of the present invention, the billet itself is addressed to remove the centerline defects therefrom prior to its being drawn into one or more barstocks of given cross-section. Looking then in particular to FIG. 10, a metal billet is shown generally at 100 as extending to an indefinite length along a longitudinal central axis, 102. Conventionally, billets of such type are formed from a molten metal such as stainless steel as a generally cylindrical casting having a diameter of from about 6–30 inches and a length of about 5 feet or more. As was mentioned hereinbefore, it is well known that the contraction exhibited by the billet during the directional solidification thereof results in the concentration of inhomogeneities such as impurities, inclusions, occlusions, voids, and other defects within a generally cylindrical "pipe" or core region. As is represented in phantom at 104 for billet 100, such core region extends along the longitudinal central axis of the billet and is further propagated as the billet is rolled or otherwise worked into barstock.

Pursuant to the present invention, billet 100 is sectioned, as is represented by cut lines 106 and 108 and cut lines 110 and 112, through central axis 102 into at least four workpiece sectors, 114a–d, of about equal cross-section. Although for illustrative purposes billet 100 is shown as being quartered, it may be sectioned into six or more workpiece sectors 114 depending upon the relative dimensions of the billet and the barstock which is to result.

As is shown in FIG. 11 for workpiece 114a, each of the workpieces 114 thereby are formed as having a first and a second surface, 116 and 118, respectively, which intersect to define an inner edge portion, represented at 120, within which at least a portion, 122, of core region 104 is localized. In this regard, the wedge-shaped geometry of the workpieces 114 advantageously facilitates the removal of this edge portion and, accordingly, the centerline defects localized therein. Accordingly, each of the workpieces 114 may be chamfered along the plane shown in phantom in FIG. 11 at 124 for workpiece 114a for the removal of edge portion 120 and core region portion 122. For a typical billet having a diameter of about 6 inches, the removed edge portion 120 may have linear dimensions, referenced in FIG. 11 at "x" and "y," of from about 0.5–3 inches defining a cross-sectional area of about 0.5–18 square inches, such area representing about 2–3% of the total area of workpiece 114a.

With edge portion 120 thereof so removed, each of the workpieces 114 may be rolled or otherwise reduced in cross-section into an elongate barstock which may be dimensioned and sectioned as in FIG. 4 for the machining of a fluid connector fitting, such as fitting 10 or 10' of FIGS. 1 and 2, having given lengthwise and widthwise extents. It will be appreciated, however, that in contrast to barstock 40 of FIG. 4 which is representative of the prior art, any remaining defects in the barstock worked from workpiece 114 of the present invention are localized as surface rather than centerline defects. Such surface localization presents a decreased potential for the breaching of a critical pressure boundary of the fitting.

Thus, a unique manufacture especially adapted for the fabrication of "miniature" branch fluid connectors from stainless steel or the like is described. Such manufacture segregates defects in the metal from the critical areas of the fitting, and thereby reduces the potential that a defect will penetrate a critical area such as a pressure boundary of the fitting. Thus, the rejection rate in the manufacture of such fittings is reduced, as is the potential for service failures.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A method of forming a fluid connector fitting from a length of an elongate metal stock worked from an ingot having centerline inhomogeneitics, said inhomogeneities being propagated in said stock along a longitudinal central axis thereof during the working of said ingot, said fitting being of a variety having one or more branches extending therefrom for coupling in fluid communication with a fluid conduit and being of a given lengthwise extent and given first and second widthwise extents, said method comprising the steps of:

(a) providing said stock as having a cross-section of a first dimension and a second dimension which is at least about twice the extent of the first or the second widthwise extent of the fitting;

(b) sectioning through the second dimension of said stock along the longitudinal central axis thereof to equally divide said stock into at least a first and a second workpiece; and (c) machining the fitting from one of said workpieces.

2. The method of claim 1 wherein the first dimension of said stock provided in step (a) is of an indefinite extent and wherein said method further comprises the additional step prior to step (c) of:

sectioning through the first dimension of said stock such that the first and second workpieces of step (b) each extend along a corresponding longitudinal axis thereof as having a cross-section of a first and a second width which correspond, respectively, to the first and second widthwise extents of said fitting.

3. The method of claim 1 wherein the first dimension of said stock provided in step (a) is at least about equal to the extent of the other widthwise extent of the fitting, and wherein the first and second workpieces of step (b) each extend along a corresponding longitudinal axis thereof and have a cross-section of a first and a second width which correspond, respectively, to the first and second widthwise extents of said fitting.

4. The method of claim 3 further comprising the additional step intermediate steps (b) and (c) of:

sectioning at least one of said workpieces generally perpendicular to the longitudinal axis thereof into at least one blank having a length at least about equal to the lengthwise extent of said fitting, said blank having a first surface through which said stock was sectioned and an opposing second surface, wherein said fitting is machined in step (c) from said blank.

5. The method of claim 4 wherein said fitting is configured as a tee connector having tubular first and second branches extending from opposite ends of said fitting along a first axis, and a tubular third branch extending along a second axis disposed perpendicular to said first axis, and wherein said connector is machined in step (c) from said blank such that the first axis of said connector is disposed generally parallel to the first surface of said blank.

6. The method of claim 5 wherein said connector is further machined in step (c) such that the second axis of said connector is disposed parallel to the first surface of said blank.

7. The method of claim 5 wherein said connector is further machined in step (c) such that the second axis of said connector is disposed perpendicular to the first surface of said blank.

8. The method of claim 7 wherein said connector is further machined in step (c) such that said third branch of said connector extends from said connector toward the first surface of said blank.

9. The method of claim 7 wherein said connector is further machined in step (c) such that said third branch of said connector extends from said connector toward the second surface of said blank.

10. The method of claim 4 wherein said fitting is configured as an elbow connector having a tubular first branch extending from said fitting along a first axis, and a tubular second branch extending along a second axis disposed perpendicular to said first axis, and wherein said connector is machined in step (c) from said blank such that the first or second axis of said connector is disposed generally parallel to the first surface of said blank.

11. The method of claim 10 wherein said connector is further machined in step (c) such that the other of the first or second axis of said connector is disposed parallel to the first surface of said blank.

12. The method of claim 10 wherein said connector is further machined in step (c) such that the other of the first or second axis of said connector is disposed perpendicular to the first surface of said blank.

13. The method of claim 12 wherein said connector is further machined in step (c) such that said other of the first or second branch of said connector extends from said connector toward the first surface of said blank.

14. The method of claim 12 wherein said connector is further machined in step (c) such that said other of the first or second branch of said connector extends from said connector toward the second surface of said blank.

15. The method of claim 3 wherein the first and second dimensions of said stock are about equal.

16. The method of claim 3 wherein one of the first and second dimensions of said stock is about twice the other dimension.

17. The method of claim 1 wherein said stock is formed of a metal selected from the group consisting of copper, brass, steel, stainless steel, titanium, nickel and alloys thereof.

18. The method of claim 3 wherein said stock is provided in step (a) as having a cross-section of a first dimension which is at least about twice the extent of the first or second widthwise extent of the fitting, and further comprising the additional step after step (a) and prior to step (c) of sectioning through the first dimension of said stock along the longitudinal central axis thereof to divide said stock into at least four workpieces, each of said workpieces extending along a corresponding longitudinal axis thereof and having a cross-section of a first and a second width which correspond, respectively, to the first and second widthwise extents of said fitting.

19. A method of forming a workpiece for the machining of a fluid connector fitting from a length of an elongate metal worked from an ingot having centerline inhomogeneities, said inhomogeneities being propagated in said stock along a longitudinal central axis thereof during the working of said ingot, said fitting having a given lengthwise extent and given first and second widthwise extents, and said method comprising the steps of:

(a) providing said stock as having a cross-section of a first dimension and a second dimension which is at least about twice the extent of the first or the second widthwise extent of the fitting; and (b) sectioning through the second dimension of said stock along the longitudinal central axis thereof to equally divide said stock into at least a first and a second workpiece.

20. The method of claim 19 wherein the first dimension of said stock provided in step (a) is of an indefinite extent and wherein said method further comprises the following step (a) of:

sectioning through the first dimension of said stock such that the first and second workpieces of step (b) each extend along a corresponding longitudinal axis thereof as having a cross-section of a first and a second width which correspond, respectively, to the first and second widthwise extents of said fitting.

21. The method of claim 19 wherein the first dimension of said stock provided in step (a) is at least about equal to the extent of other widthwise extent of the fitting, and wherein the first and second workpieces of step (b) each extend along a corresponding longitudinal axis thereof and have a cross-section of a first and a second width which correspond, respectively, to the first and second widthwise extents of said fitting.

22. The method of claim 21 further comprising the additional step intermediate steps (a) and (b) of:

sectioning at least one of said workpieces generally perpendicular to the longitudinal axis thereof into at least one blank for the machining of said fitting having a length at least about equal to the lengthwise extent of said fitting, said blank having a first surface through which said stock was sectioned and an opposing second surface.

23. The method of claim 21 wherein the first and second dimensions of said stock are about equal.

24. The method of claim 21 wherein one of the first and second dimensions of said stock is about twice the other dimension.

25. The method of claim 19 wherein said stock is formed of a metal selected from the group consisting of copper, brass, steel, or stainless steel stainless steel, titanium, nickel and alloys thereof.

26. The method of claim 21 wherein said stock is provided in step (a) as having a cross-section of a first dimension which is at least about twice the extent of the first or second widthwise extent of the fitting, and further comprising the additional step after step (a) and prior to step (c) of sectioning through the first dimension of said stock along the longitudinal central axis thereof to divide said stock into at least four workpieces, each of said workpieces extending along a corresponding longitudinal axis thereof and having a cross-section of a first and a second width which correspond, respectively, to the first and second widthwise extents of said fitting.

* * * * *